(12) United States Patent
Dai et al.

(10) Patent No.: US 10,200,916 B2
(45) Date of Patent: Feb. 5, 2019

(54) METHOD OF DISTRIBUTING SECURITY KEY CONTEXT, MOBILITY MANAGEMENT ENTITY, AND BASE STATION

(71) Applicant: Huawei Technologies Co., Ltd., Shenzhen (CN)

(72) Inventors: Mingzeng Dai, Shanghai (CN); Jian Zhang, Shanghai (CN); Qinghai Zeng, Shanghai (CN); Yi Guo, Shanghai (CN); Hongping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 15/193,541

(22) Filed: Jun. 27, 2016

(65) Prior Publication Data

US 2016/0309375 A1 Oct. 20, 2016

Related U.S. Application Data

(63) Continuation of application No. PCT/CN2014/082317, filed on Jul. 16, 2014.

(30) Foreign Application Priority Data

Dec. 27, 2013 (CN) .......................... 2013 1 0739640

(51) Int. Cl.
*H04W 36/00* (2009.01)
*H04W 12/04* (2009.01)
(Continued)

(52) U.S. Cl.
CPC ....... *H04W 36/0038* (2013.01); *H04W 12/04* (2013.01); *H04W 36/12* (2013.01); *H04W 76/15* (2018.02); *H04W 84/042* (2013.01)

(58) Field of Classification Search
None
See application file for complete search history.

(56) References Cited

U.S. PATENT DOCUMENTS 9,820,196 B2 * 11/2017 Uchino ............. H04W 36/0038
2011/0116629 A1 5/2011 Forsberg et al.
(Continued)

FOREIGN PATENT DOCUMENTS

CN 101489271 A 7/2009
CN 101945384 A 1/2011
(Continued)

OTHER PUBLICATIONS

Partial English Translation and Abstract of Chinese Patent Application No. CN103747442, dated Jul. 13, 2016, 5 pages.
(Continued)

*Primary Examiner* — Robert C Scheibel
(74) *Attorney, Agent, or Firm* — Conley Rose, P.C.

(57) ABSTRACT

A method of distributing a security key context, where the method includes receiving, by a mobility management entity, a first indication from a primary base station, where the first indication is used for requesting a path switch from the mobility management entity and indicating that the path switch is triggered by carrier aggregation between base stations, processing the path switch according to the first indication, and keeping, according to the first indication, the security key context for the path switch unchanged, and sending a second indication to the primary base station, to indicate the primary base station to keep the security key context unchanged, or sending a third indication to the primary base station, to indicate the primary base station to acquire a quantity of times of reversal of a next hop chaining counter in the security key context.

18 Claims, 9 Drawing Sheets

(51) Int. Cl.
*H04W 76/15* (2018.01)
*H04W 36/12* (2009.01)
*H04W 84/04* (2009.01)

(56) References Cited

U.S. PATENT DOCUMENTS

| | | | |
|---|---|---|---|
| 2012/0129499 A1 | 5/2012 | Li | |
| 2013/0196694 A1 | 8/2013 | Vanderveen et al. | |
| 2015/0111577 A1* | 4/2015 | Bao | H04W 36/24 455/436 |
| 2015/0358866 A1* | 12/2015 | Xu | H04W 36/00 370/331 |
| 2015/0365822 A1* | 12/2015 | Sharma | H04W 12/04 455/410 |
| 2015/0365852 A1* | 12/2015 | Xu | H04W 36/0027 370/331 |
| 2016/0165438 A1* | 6/2016 | Xu | H04W 12/04 380/278 |
| 2016/0191471 A1* | 6/2016 | Ryoo | H04W 12/04 455/411 |

FOREIGN PATENT DOCUMENTS

| | | |
|---|---|---|
| CN | 102612163 A | 7/2012 |
| CN | 103747442 A | 4/2014 |
| RU | 2483475 C2 | 5/2013 |
| WO | 2012097644 A1 | 7/2012 |
| WO | 2014148762 A1 | 9/2014 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300, V11.7.0, Technical Specification, Sep. 2013, 209 pages.
"3rd Generation Partnership Project; Technical Specification Group Radio Access Network; Evolved Universal Terrestrial Radio Access Network (E-UTRAN); S1 Application Protocol (S1AP) (Release 12)," 3GPP TS 36.413, V12.0.0, Technical Specification, Dec. 2013, 278 pages.
"Potential Mobility Issues to support MSA UP 1A," 3GPP TSG-RAN WG3 Meeting #82, R3-132066, Nov. 11-15, 2013, 4 pages.
"Dual Connectivity Impact to S1/X2," 3GPP TSG-RAN WG3 #83, R3-140144, Feb. 10-14, 2014, 3 pages.
Foreign Communication From a Counterpart Application, Chinese Application No. 201310739640.X, Chinese Office Action dated Aug. 3, 2016, 5 pages.
Foreign Communication From a Counterpart Application, European Application No. 14875711.5, Extended European Search Report dated Dec. 1, 2016, 9 pages.
Foreign Communication From a Counterpart Application, PCT Application No. PCT/CN2014/082317, English Translation of International Search Report dated Oct. 22, 2014, 2 pages.
Foreign Communication From a Counterpart Application, PCT Application No. PCT/CN2014/082317, English Translation of Written Opinion dated Oct. 22, 2014, 9 pages.
Machine Translation and Abstract of International Publication No. WO2012097644, dated Jul. 26, 2012, 26 pages.
Foreign Communication From a Counterpart Application, Russian Application No. 2016130596/07, Decision on Grant dated Oct. 18, 2017, 15 pages.
Foreign Communication From a Counterpart Application, Russian Application No. 2016130596/07, English Translation of Decision on Grant dated Oct. 18, 2017, 9 pages.
Foreign Communication From a Counterpart Application, Russian Application No. 2016130596/07, Russian Search Report dated Oct. 3, 2017, 2 pages.

\* cited by examiner

METHOD OF DISTRIBUTING SECURITY KEY CONTEXT, MOBILITY MANAGEMENT ENTITY, AND BASE STATION

CROSS-REFERENCE TO RELATED APPLICATIONS

This application is a continuation of International Application No. PCT/CN2014/082317, filed on Jul. 16, 2014, which claims priority to Chinese Patent Application No. 201310739640.X, filed on Dec. 27, 2013, both of which are hereby incorporated by reference in their entireties.

TECHNICAL FIELD

The present disclosure relates to the field of communications technologies, and in particular, to a method of distributing a security key context, a mobility management entity (MME), and a base station.

BACKGROUND

Carrier aggregation of a long term evolution (LTE) system may be roughly classified into carrier aggregation in a base station and carrier aggregation between base stations. Cell aggregation in a base station is controlled by only one base station and therefore is relatively simple. The "Release-10" release of the third generation partnership project (3GPP) supports the carrier aggregation in a base station but does not support the carrier aggregation between base stations yet. The carrier aggregation between base stations may be further classified into carrier aggregation between macro base stations and carrier aggregation between a macro base station and a small-cell base station. The carrier aggregation between base stations is also referred to as dual connectivity or multiple stream aggregation (MSA), that is, a user equipment (UE) may simultaneously receive data from two or more base stations.

At present, in the carrier aggregation between base stations, base stations are classified into a primary base station and a secondary base station, where the primary base station is mainly responsible for implementing a control function and transmitting some data, and the secondary base station is mainly configured to offload data. If the primary base station decides to hand over a bearer from one base station (for example, the primary base station) to another base station (for example, the secondary base station), a path switch procedure needs to be performed to complete a path switch. At present, a path switch technology is mainly applied to an X2 handover.

However, the carrier aggregation between base stations is different from the X2 handover. A secondary evolved node B (eNB) may be a small-cell base station, during the carrier aggregation between base stations, each bearer handover requires a path switch procedure. Therefore, a possibility of occurrence of a path switch is far greater than that of the X2 handover, and frequent path switches easily cause network security to be out of synchronization, resulting in a call drop of a UE.

SUMMARY

Embodiments of the present disclosure provide a method of distributing a security key context, a MME, and a base station, which are used to improve reliability of a path switch during carrier aggregation between base stations.

One aspect of the present disclosure provides a MME, including a receiving unit configured to receive a first indication from a primary base station, where the first indication is used for requesting a path switch from the MME and indicating that the path switch is triggered by carrier aggregation between base stations, where the base stations include the primary base station, a path switch unit configured to process the path switch according to the first indication, and a sending unit configured to send a second indication to the primary base station according to the first indication, where the second indication is used for indicating the primary base station to keep a security key context for the path switch unchanged, where the MME keeps the security key context unchanged according to the first indication, or send a third indication to the primary base station according to the first indication such that the primary base station acquires a quantity of times of reversal of a next hop (NH) chaining counter (NCC) in the security key context according to the third indication, where the quantity of times of reversal refers to a quantity of times that the NCC jumps from a maximum value to a minimum value.

Based on the first aspect of the present disclosure, in a first possible implementation manner, the second indication carries the security key context.

Based on the first aspect of the present disclosure, in a second possible implementation manner, the MME further includes a recording unit configured to record the quantity of times of reversal of the NCC in the security key context, and the third indication carries the recorded quantity of times of reversal of the NCC in the security key context.

Based on the first aspect of the present disclosure, or the first possible implementation manner of the first aspect of the present disclosure, or the second possible implementation manner of the first aspect of the present disclosure, in a third possible implementation manner, the sending unit is further configured to send the first indication to a serving gateway (SGW) such that the SGW uses an original path according to the first indication when the path switch fails, and the MME further includes an indication unit configured to indicate the primary base station to use the original path when the SGW indicates that the path switch fails.

Based on the first aspect of the present disclosure, or the first possible implementation manner of the first aspect of the present disclosure, or the second possible implementation manner of the first aspect of the present disclosure, in a fourth possible implementation manner, the first indication includes path information, where the path information includes an identifier of a first path allocated by the primary base station for the path switch, an identifier of a second path allocated by a secondary base station for the path switch, a priority of the first path, and a priority of the second path, and the base stations include the secondary base station, and the sending unit is further configured to send the path information to a SGW such that the SGW switches a path to the first path or the second path preferentially according to a path with a higher priority when the receiving unit receives the first indication.

A second aspect of the present disclosure provides a base station, including a sending unit configured to send a first indication to a MME such that the MME processes a path switch according to the first indication, where the first indication is used for requesting the path switch from the MME and indicating that the path switch is triggered by carrier aggregation between base stations, a receiving unit configured to receive a second indication from the MME, or receive a third indication from the MME, and a processing unit configured to keep a security key context for the path switch unchanged according to the second indication when the receiving unit receives the second indication from the MME, or configured to acquire a quantity of times of reversal of an NCC in the security key context according to the third indication when the receiving unit receives the third indication from the MME, and send the NCC in the security key context and the quantity of times of reversal of the NCC to the UE using the sending unit such that the UE derives the security key according to the NCC and the quantity of times of reversal of the NCC when a UE needs to derive a security key, where the quantity of times of reversal refers to a quantity of times that the NCC jumps from a maximum value to a minimum value.

Based on the second aspect of the present disclosure, in a first possible implementation manner, the processing unit is further configured to record the quantity of times of reversal of the NCC in the security key context under instruction of the third indication when the receiving unit receives the third indication from the MME.

Based on the second aspect of the present disclosure, in a second possible implementation manner, the third indication carries the quantity of times of reversal of the NCC in the security key context, and the processing unit is further configured to acquire the quantity of times of reversal of the NCC in the security key context from the third indication when the receiving unit receives the third indication from the MME.

Based on the second aspect of the present disclosure, or the first possible implementation manner of the second aspect of the present disclosure, or the second possible implementation manner of the second aspect of the present disclosure, in a third possible implementation manner, the first indication is further used for indicating the MME to instruct a SGW to use an original path when the path switch fails, and the base station further includes a path control unit configured to use the original path when the SGW indicates that the path switch fails, and send a bearer release message to a secondary base station using the sending unit, to indicate the secondary base station to release a bearer for which the current path switch is performed.

Based on the second aspect of the present disclosure, or the first possible implementation manner of the second aspect of the present disclosure, or the second possible implementation manner of the second aspect of the present disclosure, in a fourth possible implementation manner, the base station further includes an allocating unit configured to allocate a first path for the path switch, an acquiring unit configured to acquire a second path allocated by a secondary base station for the path switch, and a priority determining unit configured to determine a priority of the first path and a priority of the second path, and the sending unit is further configured to add path information to the first indication, where the path information includes an identifier of the first path, an identifier of the second path, the priority of the first path, and the priority of the second path such that the MME sends the path information to a SGW, and the SGW switches a path to the first path or the second path preferentially according to a path with a higher priority.

A third aspect of the present disclosure provides a method of distributing a security key context, including receiving, by a MME, a first indication from a primary base station, where the first indication is used for requesting a path switch from the MME and indicating that the path switch is triggered by carrier aggregation between base stations, where the base stations include the primary base station, and processing, by the MME, the path switch according to the first indication, and according to the first indication, keeping, by the MME, a security key context for the path switch unchanged, and sending a second indication to the primary base station, where the second indication is used for indicating the primary base station to keep the security key context unchanged, or sending, by the MME, a third indication to the primary base station, where the third indication is used for indicating the primary base station to acquire a quantity of times of reversal of an NCC in the security key context, where the quantity of times of reversal refers to a quantity of times that the NCC jumps from a maximum value to a minimum value.

Based on the third aspect of the present disclosure, in a first possible implementation manner, sending a second indication to the primary base station includes adding the security key context to the second indication.

Based on the third aspect of the present disclosure, in a second possible implementation manner, the method further includes recording the quantity of times of reversal of the NCC in the security key context, and sending, by the MME, a third indication to the primary base station according to the first indication includes adding the recorded quantity of times of reversal of the NCC in the security key context to the third indication.

Based on the second aspect of the present disclosure, or the first possible implementation manner of the second aspect of the present disclosure, or the second possible implementation manner of the second aspect of the present disclosure, in a third possible implementation manner, processing, by the MME, the path switch according to the first indication includes sending the first indication to a SGW such that the SGW uses an original path according to the first indication when the path switch fails, and indicating the primary base station to use the original path when the SGW indicates that the path switch fails.

Based on the second aspect of the present disclosure, or the first possible implementation manner of the second aspect of the present disclosure, or the second possible implementation manner of the second aspect of the present disclosure, in a fourth possible implementation manner, the first indication includes path information, where the path information includes an identifier of a first path allocated by the primary base station for the path switch, an identifier of a second path allocated by a secondary base station for the path switch, a priority of the first path, and a priority of the second path, and the base stations include the secondary base station, and processing, by the MME, the path switch according to the first indication includes sending the path information to a SGW such that the SGW switches a path to the first path or the second path preferentially according to a path with a higher priority.

A fourth aspect of the present disclosure provides a method of distributing a security key context, including sending, by a primary base station, a first indication to a MME such that the MME processes a path switch according to the first indication, where the first indication is used for requesting the path switch from the MME and indicating that the path switch is triggered by carrier aggregation between base stations, where the base stations include the primary base station, and receiving, by the primary base station, a second indication from the MME, and keeping a security key context for the path switch unchanged under instruction of the second indication, or receiving, by the primary base station, a third indication from the MME, acquiring a quantity of times of reversal of an NCC in the security key context according to the third indication, and sending the NCC in the security key context and the quantity of times of reversal of the NCC to a UE such that the UE derives the security key according to the NCC and the quantity of times of reversal of the NCC when the UE needs to derive a security key, where the quantity of times of reversal refers to a quantity of times that the NCC jumps from a maximum value to a minimum value.

Based on the fourth aspect of the present disclosure, in a first possible implementation manner, acquiring a quantity of times of reversal of an NCC in the security key context according to the third indication includes recording the quantity of times of reversal of the NCC in the security key context under instruction of the third indication.

Based on the fourth aspect of the present disclosure, in a second possible implementation manner, the third indication carries the quantity of times of reversal of the NCC in the security key context, and acquiring a quantity of times of reversal of an NCC in the security key context according to the third indication includes acquiring the quantity of times of reversal of the NCC in the security key context from the third indication.

Based on the fourth aspect of the present disclosure, or the first possible implementation manner of the fourth aspect of the present disclosure, or the second possible implementation manner of the fourth aspect of the present disclosure, in a third possible implementation manner, the first indication is further used for indicating the MME to instruct a SGW to use an original path when the current path switch fails, and the method further includes using the original path when the SGW indicates that the path switch fails, and sending a bearer release message to a secondary base station, to indicate the secondary base station to release a bearer for which the current path switch is performed, where the base stations include the secondary base station.

Based on the fourth aspect of the present disclosure, or the first possible implementation manner of the fourth aspect of the present disclosure, or the second possible implementation manner of the fourth aspect of the present disclosure, in a fourth possible implementation manner, before sending, by a primary base station, a first indication to a MME, the method includes allocating a first path for the path switch and determining a priority of the first path, and acquiring a second path allocated by a secondary base station for the path switch and determining a priority of the second path, and sending, by a primary base station, a first indication to a MME includes adding path information to the first indication, where the path information includes an identifier of the first path, an identifier of the second path, the priority of the first path, and the priority of the second path such that the MME sends the path information to a SGW, and the SGW switches a path to the first path or the second path preferentially according to a path with a higher priority.

It can be seen from the foregoing technical solutions that, the embodiments of the present disclosure have the following advantages.

It can be seen from the foregoing technical solutions that, in the embodiments of the present disclosure, when a primary base station sends a first indication to a MME, the MME processes a path switch according to the first indication, and under instruction of the first indication, keeps a security key context for the path switch unchanged and instructs the primary base station to keep the security key context for the path switch unchanged, or under instruction of the first indication, indicates the primary base station to acquire a quantity of times of reversal of an NCC in the security key context such that synchronization of the security key context can still be ensured in a case in which a quantity of times of path switches triggered by carrier aggregation between base stations is excessively large, thereby improving reliability of a path switch during carrier aggregation between base stations.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

Embodiments of the present disclosure provide a method of distributing a security key context, a MME, and a base station.

To make the disclosure objectives, features, and advantages of the present disclosure clearer and more comprehensible, the following clearly and completely describes the technical solutions in the embodiments of the present disclosure with reference to the accompanying drawings in the embodiments of the present disclosure. The embodiments described are merely a part rather than all of the embodiments of the present disclosure. All other embodiments obtained by a person of ordinary skill in the art based on the embodiments of the present disclosure without creative efforts shall fall within the protection scope of the present disclosure.

Figure 1A:
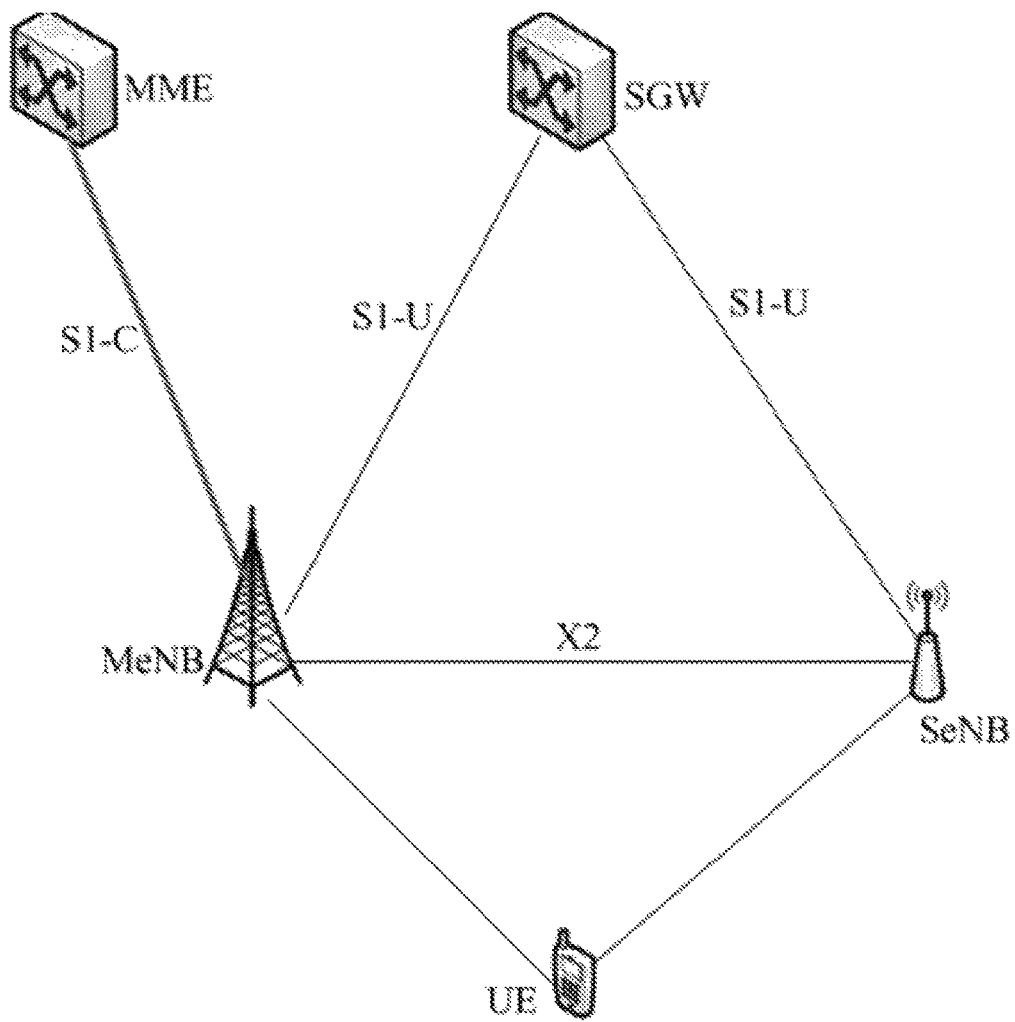
FIG. 1A is a schematic diagram of a network application scenario of carrier aggregation between base stations according to the present disclosure.
Figure 1B:
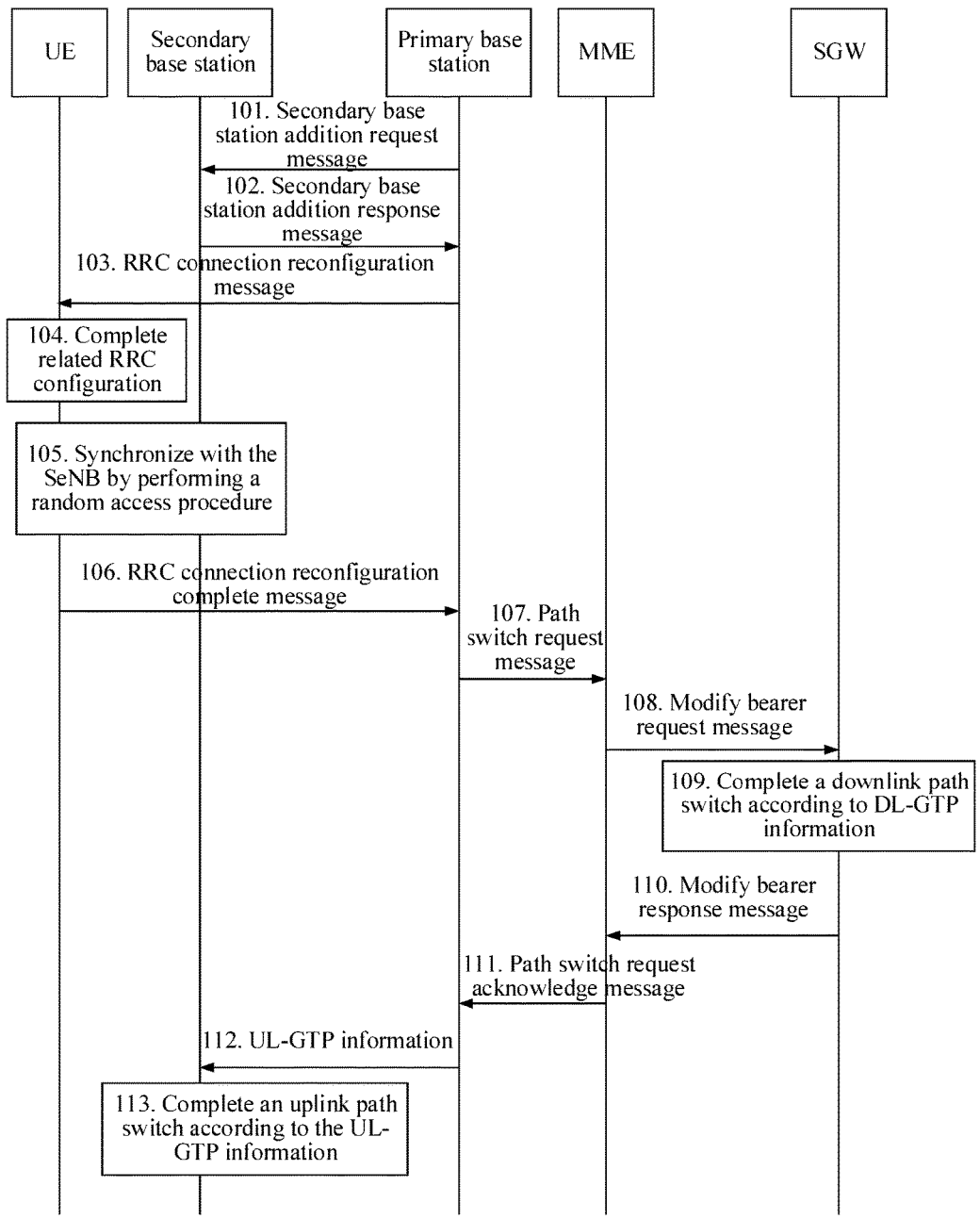
FIG. 1B is a schematic diagram of a bearer handover procedure in an application scenario according to the present disclosure.

First, a process of carrier aggregation between base stations in an embodiment of the present disclosure is described. As shown in FIG. 1A, for an LTE system, FIG. 1A is a schematic diagram of a network application scenario of carrier aggregation between base stations. As shown in FIG. 1A, an S1-C interface is configured to connect an MME and a primary base station, S1-U interfaces are separately configured to connect an SGW and the primary base station (recorded as an S1-U path 1) and connect the SGW and a secondary base station (recorded as an S1-U path 2), and the primary base station is interconnected with the secondary base station using an X2 interface. When the primary base station decides to hand over a bearer of a UE to the secondary base station, a path switch procedure needs to be performed to complete a switch of an S1-U path, that is, a transmission path of the bearer is switched from the S1-U path 1 to the S1-U path 2. Using addition of the secondary base station as an example, a general process is shown in FIG. 1B.

Step 101: When deciding to offload data to the secondary base station, the primary base station sends a secondary base station addition request message to the secondary base station using the X2 interface, where the message includes a related parameter of a bearer to be established on the secondary base station, for example, a standard of the bearer, a quality of service (QoS) parameter of the bearer, or the like.

Step 102: If the secondary base station allows bearer access, the secondary base station sends a secondary base station addition response message to the primary base station, where the message carries radio resource control (RRC) protocol configuration signaling related to access to the secondary base station.

Step 103: The primary base station generates an RRC connection reconfiguration message according to the RRC protocol configuration information that is carried in the secondary base station addition response message and related to the access to the secondary base station, and sends the RRC connection reconfiguration message to the UE.

Step 104: After receiving the RRC connection reconfiguration message, the UE completes related RRC configuration according to the RRC connection reconfiguration message.

Step 105: The UE synchronizes with the secondary base station by performing a random access procedure.

Step 106: The UE sends an RRC connection reconfiguration complete message to the primary base station such that a switch success is confirmed.

Step 107: The primary base station sends a path switch request message to the MME, where the message carries information about a downlink general packet radio service tunnel protocol (GTP) tunnel allocated by the secondary base station for the current path switch (briefly referred to as downlink (DL)-GTP information below), where the DL-GTP information includes an endpoint identifier (tunneling endpoint identifier (TEID)) of the DL-GTP tunnel and a DL-GTP Internet Protocol (IP) address.

Step 108: The MME sends a modify bearer request message to the SGW, where the modify bearer request message includes the DL-GTP information in step 107.

Step 109: The SGW completes a downlink path switch according to the DL-GTP information.

Step 110: The SGW sends a modify bearer response message to the MME, where the modify bearer response message carries information about an uplink GTP tunnel allocated by the SGW for the current path switch (briefly referred to as an uplink (UL)-GTP information below), where the UL-GTP information includes a TEID of the UL-GTP tunnel and an uplink GTP IP address.

Step 111: The MME sends a path switch request acknowledge message to the primary base station, where the path switch request acknowledge message includes the UL-GTP information in step 110.

Step 112: The primary base station forwards the UL-GTP information to the secondary base station.

Step 113: The secondary base station completes an uplink path switch according to the UL-GTP information.

Figure 2:
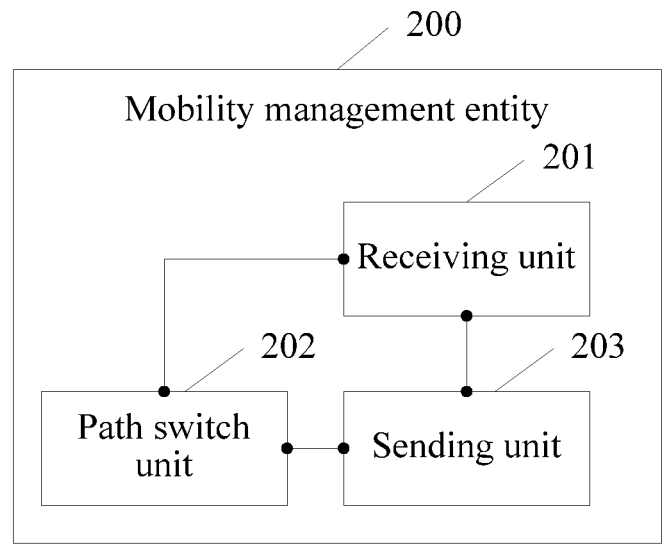
FIG. 2 is a schematic structural diagram of an embodiment of a MME according to the present disclosure.

An embodiment of the present disclosure further provides an MME. Referring to FIG. 2, an MME 200 in this embodiment of the present disclosure includes a receiving unit 201 configured to receive a first indication from a primary base station, where the first indication is used for requesting a path switch from the MME 200 and indicating that the path switch is triggered by carrier aggregation between base stations, where the base stations include the primary base station, a path switch unit 202 configured to process the path switch according to the first indication received by the receiving unit 201, where for a path switch procedure executed by the path switch unit 202 under trigger of the first indication, reference may be made to the description in the switch procedure shown in FIG. 1B, and details are not described herein again, and a sending unit 203 configured to send a second indication to the primary base station under instruction of the first indication received by the receiving unit 201, where the second indication is used for indicating the primary base station to keep a security key context for the path switch unchanged.

In an implementation manner, when confirming that the path switch performed according to a path switch request message succeeds, the MME 200 sends a path switch request acknowledge message to the primary base station using the sending unit 203, and adds the second indication to the path switch request acknowledge message. After receiving the path switch request acknowledge message, the primary base station keeps the security key context for the path switch unchanged under instruction of the second indication.

Alternatively, in another implementation manner, the MME 200 sends a new message to the primary base station, where the message carries the original security key context or does not carry a security key context. After receiving a path switch request acknowledge message, the primary base station keeps the original security key context unchanged under instruction of the second indication.

Optionally, the sending unit 203 adds the security key context for the path switch to the second indication. After receiving the second indication, the primary base station stores the security key context carried in the second indication, and sends an NCC in the security key context to a UE when determining that the UE needs to derive a security key (KeNB).

Optionally, because the primary base station has a record about the original security key context, an implicit indication manner is used to instruct the primary base station to keep the original security key context unchanged. That is, it is agreed on that the primary base station acquires the security key context according to the second indication sent by the sending unit 203. When the original security key context needs to be kept unchanged, the sending unit 203 does not add the security key context to the second indication. When the primary base station does not detect a security key context in the received second indication, the primary base station keeps the original security key context unchanged, and sends an NCC in the original security key context to a UE when determining that the UE needs to derive a KeNB.

It should be noted that, in this embodiment of the present disclosure, the MME 200 keeps the security key context for the path switch unchanged under instruction of the first indication. The first indication may be carried in a path switch request message or another new message, which is not limited herein.

In a path switch procedure, an SGW rejects a path switch request of a bearer according to a path condition and a local processing policy. Therefore, if the bearer is a default bearer, UE detachment may be caused, for example, if the bearer is a necessary bearer for maintaining a packet data network (PDN) connection, the PDN connection is released such that a UE may be detached.

Therefore, optionally, based on the embodiment shown in FIG. 2, the sending unit 203 is further configured to send the first indication to the SGW such that the SGW uses an original path under instruction of the first indication when the path switch fails, and the MME 200 further includes an indication unit configured to indicate the primary base station to use the original path when the SGW indicates that the path switch fails. Optionally, when the path switch fails, the SGW sends, to the MME 200, information indicating that the path switch fails.

Optionally, the first indication includes path information, where the path information includes an identifier of a first path allocated by the primary base station for the path switch, an identifier of a second path allocated by a secondary base station for the path switch, a priority of the first path, and a priority of the second path, based on the embodiment shown in FIG. 2, the sending unit 203 is further configured to send the path information to the SGW such that the SGW switches a path to the first path or the second path preferentially according to a path with a higher priority in the priority of the first path and the priority of the second path when the receiving unit 201 receives the first indication.

It can be seen from the foregoing technical solutions that, in this embodiment of the present disclosure, when a primary base station sends a first indication to an MME 200, the MME 200 processes a path switch according to the first indication, and under instruction of the first indication, keeps a security key context for the path switch unchanged and indicates the primary base station to keep the security key context for the path switch unchanged, or under instruction of the first indication, indicates the primary base station to acquire a quantity of times of reversal of an NCC in the security key context such that synchronization of the security key context can still be ensured in a case in which a quantity of times of path switches triggered by carrier aggregation between base stations is excessively large, thereby improving reliability of a path switch during carrier aggregation between base stations. Further, this embodiment of the present disclosure further provides a path switch indication solution such that an original path is used when the path switch fails or the path switch is performed in two or more paths according to priorities of the paths, thereby reducing a possibility of bearer release and UE detachment that are caused by a path switch failure, and further improving the reliability of a path switch during the carrier aggregation between base stations.

Figure 3:
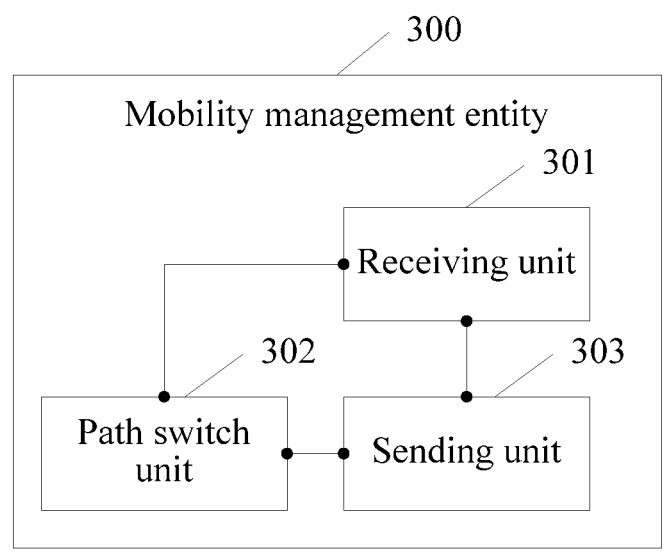
FIG. 3 is a schematic structural diagram of another embodiment of a MME according to the present disclosure.

An embodiment of the present disclosure further provides an MME. Referring to FIG. 3, an MME 300 in this embodiment of the present disclosure includes a receiving unit 301 configured to receive a first indication from a primary base station, where the first indication is used for requesting a path switch from the MME 300 and indicating that the path switch is triggered by carrier aggregation between base stations, where the base stations include the primary base station, a path switch unit 302 configured to process the path switch according to the first indication received by the receiving unit 301, where for a path switch procedure executed by the path switch unit 302 under trigger of the first indication, reference may be made to the description in the switch procedure shown in FIG. 1B, and details are not described herein again, and a sending unit 303 configured to send a third indication to the primary base station under instruction of the first indication received by the receiving unit 301 such that the primary base station acquires a quantity of times of reversal of an NCC in a security key context for the path switch according to the third indication, where the quantity of times of reversal refers to a quantity of times that the NCC jumps from a maximum value to a minimum value.

Optionally, based on the embodiment shown in FIG. 3, the MME 300 further includes a recording unit (not shown) configured to record the quantity of times of reversal of the NCC in the security key context, the sending unit 303 is further configured to add the quantity, recorded by the recording unit, of times of reversal of the NCC in the security key context to the third indication.

In a path switch procedure, an SGW rejects a path switch request of a bearer according to a path condition and a local processing policy. Therefore, if the bearer is a default bearer, UE detachment may be caused, for example, if the bearer is a necessary bearer for maintaining a PDN connection, the PDN connection is released such that a UE may be detached.

Therefore, optionally, based on the embodiment shown in FIG. 3, the sending unit 303 is further configured to send the first indication to the SGW such that the SGW uses an original path under instruction of the first indication when the path switch fails, and the MME 300 further includes an indication unit (not shown) configured to indicate the primary base station to use the original path when the SGW indicates that the path switch fails. Optionally, when the path switch fails, the SGW sends, to the MME 300, information indicating that the preceding path switch fails.

Optionally, the first indication includes path information, where the path information includes an identifier of a first path allocated by the primary base station for the path switch, an identifier of a second path allocated by a secondary base station for the path switch, a priority of the first path, and a priority of the second path. Based on the embodiment shown in FIG. 3, the sending unit 303 is further configured to send the path information to the SGW such that the SGW switches a path to the first path or the second path preferentially according to a path with a higher priority in the priority of the first path and the priority of the second path when the receiving unit 301 receives the first indication.

It can be seen from the foregoing technical solutions that, in this embodiment of the present disclosure, when a primary base station sends a first indication to an MME 300, the MME 300 processes a path switch according to the first indication, and under instruction of the first indication, keeps a security key context for the path switch unchanged and indicates the primary base station to keep the security key context for the path switch unchanged, or under instruction of the first indication, indicates the primary base station to acquire a quantity of times of reversal of an NCC in the security key context such that synchronization of the security key context can still be ensured in a case in which a quantity of times of path switches triggered by carrier aggregation between base stations is excessively large, thereby improving reliability of a path switch during carrier aggregation between base stations. Further, this embodiment of the present disclosure further provides a path switch indication solution such that an original path is used when the path switch fails or the path switch is performed in two or more paths according to priorities of the paths, thereby reducing a possibility of bearer release and UE detachment that are caused by a path switch failure, and further improving the reliability of a path switch during the carrier aggregation between base stations.

Figure 4:
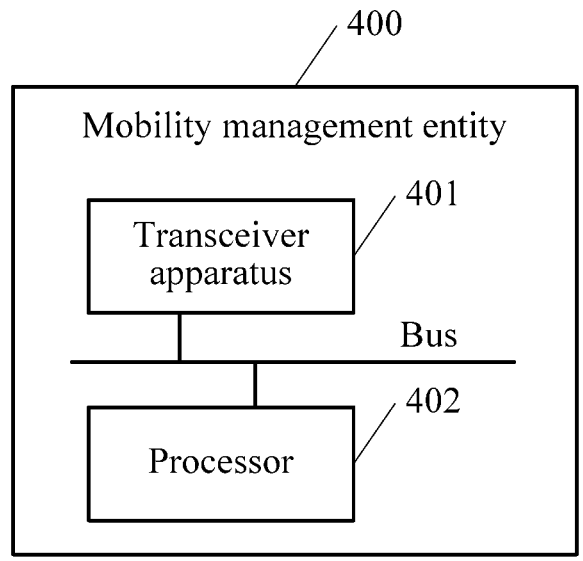
FIG. 4 is a schematic structural diagram of still another embodiment of a MME according to the present disclosure.

An embodiment of the present disclosure provides another MME. As shown in FIG. 4, an MME 400 in this embodiment of the present disclosure includes a transceiver apparatus 401 and a processor 402.

In some embodiments of the present disclosure, the transceiver apparatus 401 and the processor 402 may be connected using a bus or in another manner. As shown in FIG. 4, connection using a bus is used as an example.

The processor 402 is configured to process path switch according to the first indication when the transceiver apparatus 401 receives a first indication from a primary base station, where for a path switch procedure executed by the processor 402 under trigger of the first indication, reference may be made to the description in the switch procedure shown in FIG. 1B, and details are not described herein again.

The processor 402 is further configured to control the transceiver apparatus 401 to send a second indication to the primary base station and keep a security key context for the path switch unchanged, where the second indication is used for indicating the primary base station to keep the security key context for the path switch unchanged, or control the transceiver apparatus 401 to send a third indication to the primary base station such that the primary base station acquires a quantity of times of reversal of an NCC in the security key context according to the third indication, where the quantity of times of reversal refers to a quantity of times that the NCC jumps from a maximum value to a minimum value.

If the processor 402 controls the transceiver apparatus 401 to send the second indication to the primary base station and keeps the security key context unchanged, optionally, the processor 402 adds the security key context to the second indication.

If the processor 402 controls the transceiver apparatus 401 to send the third indication to the primary base station, optionally, the processor 402 is further configured to record the quantity of times of reversal of the NCC in the security key context, and add the recorded quantity of times of reversal of the NCC in the security key context to the third indication.

In an implementation manner, the processor 402 is further configured to control the transceiver apparatus 401 to send the first indication to an SGW such that the SGW uses an original path under instruction of the first indication when the current path switch fails, and indicate the primary base station to use the original path when the SGW indicates that the path switch fails. Optionally, the SGW sends, to the MME 400, information indicating that the preceding path switch fails when the path switch fails.

In another implementation manner, the first indication includes path information, where the path information includes an identifier of a first path allocated by the primary base station for the path switch, an identifier of a second path allocated by a secondary base station for the path switch, a priority of the first path, and a priority of the second path. The processor 402 is further configured to control the transceiver apparatus 401 to send the path information to the SGW such that the SGW switches a path to the first path or the second path preferentially according to a path with a higher priority in the priority of the first path and the priority of the second path.

It can be seen from the foregoing technical solutions that, in this embodiment of the present disclosure, when a primary base station sends a first indication to an MME 400, the MME 400 processes a path switch according to the first indication, and under instruction of the first indication, keeps a security key context for the path switch unchanged and indicates the primary base station to keep the security key context for the path switch unchanged, or under instruction of the first indication, indicates the primary base station to acquire a quantity of times of reversal of an NCC in the security key context such that synchronization of the security key context can still be ensured in a case in which a quantity of times of path switches triggered by carrier aggregation between base stations is excessively large, thereby improving reliability of a path switch during carrier aggregation between base stations.

Figure 5:
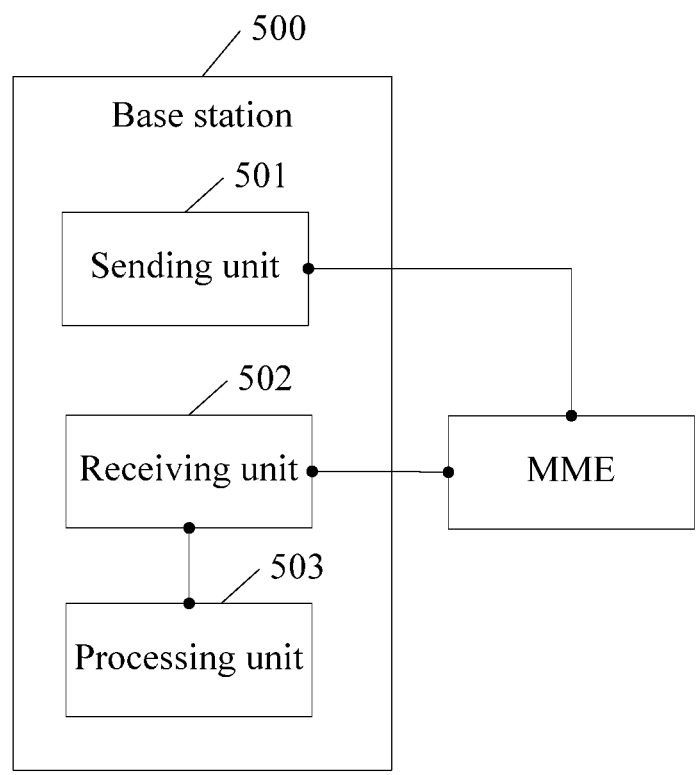
FIG. 5 is a schematic structural diagram of an embodiment of a base station according to the present disclosure.

An embodiment of the present disclosure further provides a base station. Referring to FIG. 5, a base station 500 in this embodiment of the present disclosure includes a sending unit 501 configured to send a first indication to an MME such that the MME processes a path switch according to the first indication, where the first indication is used for requesting the path switch from the MME and indicating that the path switch is triggered by carrier aggregation between base stations, a receiving unit 502 configured to receive a second indication from the MME, or receive a third indication from the MME, and a processing unit 503 configured to keep a security key context for the path switch unchanged according to the second indication when the receiving unit 502 receives the second indication from the MME, or configured to acquire a quantity of times of reversal of an NCC in the security key context according to the third indication when the receiving unit 502 receives the third indication from the MME, and when a UE needs to derive a security key, control the sending unit 501 to send the NCC in the security key context and the quantity of times of reversal of the NCC to the UE such that the UE derives the security key according to the NCC in the security key context and the quantity of times of reversal of the NCC, where the quantity of times of reversal refers to a quantity of times that the NCC jumps from a maximum value to a minimum value.

Optionally, the processing unit 503 is further configured to record the quantity of times of reversal of the NCC in the security key context under instruction of the third indication when the receiving unit 502 receives the third indication from the MME.

Optionally, the third indication carries the quantity of times of reversal of the NCC in the security key context, the processing unit 503 is further configured to acquire the quantity of times of reversal of the NCC in the security key context from the third indication when the receiving unit 502 receives the third indication from the MME.

In an implementation manner, the first indication is further used for indicating the MME to instruct an SGW to use an original path when the path switch fails. The base station 500 in this embodiment of the present disclosure further includes a path control unit (not shown) configured to use the original path when the SGW indicates that the path switch fails, and send a bearer release message to a secondary base station using the sending unit 501, to indicate the secondary base station to release a bearer for which the current path switch is performed.

In another implementation manner, the base station in this embodiment of the present disclosure further includes an allocating unit (not shown), an acquiring unit (not shown), and a priority determining unit (not shown), where the allocating unit is configured to allocate a first path for the path switch, the acquiring unit is configured to acquire a second path allocated by the secondary base station for the path switch, and the priority determining unit is configured to determine a priority of the first path and a priority of the second path. The sending unit 501 is further configured to send path information to the MME, where the path information includes an identifier of the first path, an identifier of the second path, the priority of the first path, and the priority of the second path such that the MME sends the path information to the SGW, and the SGW switches a path to the first path or the second path preferentially according to a path with a higher priority.

It can be seen from the foregoing technical solutions that, in this embodiment of the present disclosure, when a path switch is triggered by carrier aggregation between base stations, a base station 500 sends a first indication to an MME such that the MME processes the path switch according to the first indication, and under instruction of the first indication, keeps a security key context for the path switch unchanged and indicates a primary base station to keep the security key context for the path switch unchanged, or under instruction of the first indication, indicates the primary base station to acquire a quantity of times of reversal of an NCC in the security key context such that synchronization of the security key context can still be ensured in a case in which a quantity of times of path switches triggered by carrier aggregation between base stations is excessively large, thereby improving reliability of a path switch during carrier aggregation between base stations.

Figure 6:
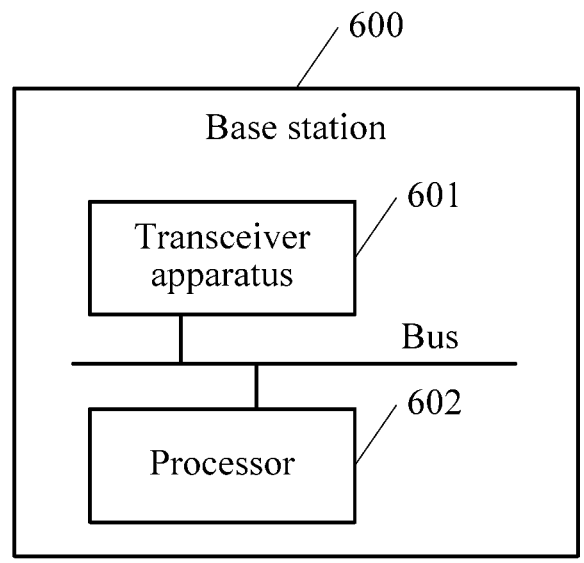
FIG. 6 is a schematic structural diagram of another embodiment of a base station according to the present disclosure.

An embodiment of the present disclosure provides another base station. As shown in FIG. 6, a base station 600 in this embodiment of the present disclosure includes a transceiver apparatus 601 and a processor 602.

In some embodiments of the present disclosure, the transceiver apparatus 601 and the processor 602 may be connected using a bus or in another manner. As shown in FIG. 6, connection using a bus is used as an example.

The processor 602 is configured to control the transceiver apparatus 601 to send a first indication to an MME such that the MME processes a path switch according to the first indication, where the first indication is used for requesting the path switch from the MME and indicating that the path switch is triggered by carrier aggregation between base stations, and when the transceiver apparatus 601 receives a second indication from the MME, keep a security key context for the path switch unchanged under instruction of the second indication, or acquire a quantity of times of reversal of an NCC in the security key context according to the third indication when the transceiver apparatus 601 receives a third indication from the MME, and control the transceiver apparatus 601 to send the NCC in the security key context and the quantity of times of reversal of the NCC to the UE such that the UE derives the security key according to the NCC in the security key context and the quantity of times of reversal of the NCC when a UE needs to derive a security key, where the quantity of times of reversal refers to a quantity of times that the NCC jumps from a maximum value to a minimum value.

Optionally, the processor 602 is further configured to record the quantity of times of reversal of the NCC in the security key context under instruction of the third indication when the transceiver apparatus 601 receives the third indication from the MME.

Optionally, the third indication carries the quantity of times of reversal of the NCC in the security key context. The processor 602 is further configured to acquire the quantity of times of reversal of the NCC in the security key context from the third indication when the transceiver apparatus 601 receives the third indication from the MME.

In an implementation manner, the first indication is further used for indicating the MME to instruct an SGW to use an original path when the path switch fails. The processor 602 is configured to use the original path when the SGW indicates that the path switch fails, and control the transceiver apparatus 601 to send a bearer release message to a secondary base station, to indicate the secondary base station to release a bearer for which the current path switch is performed.

In another implementation manner, the processor 602 is further configured to allocate a first path for the path switch and determine a priority of the first path, acquire a second path allocated by the secondary base station for the path switch and determine a priority of the second path, and control the transceiver apparatus 601 to send path information to the MME, where the path information includes an identifier of the first path, an identifier of the second path, the priority of the first path, and the priority of the second path such that the MME sends the path information to the SGW, and the SGW switches a path to the first path or the second path preferentially according to a path with a higher priority.

It can be seen from the foregoing technical solutions that, in this embodiment of the present disclosure, when a path switch is triggered by carrier aggregation between base stations, a base station 600 sends a first indication to an MME such that the MME processes the path switch according to the first indication, and under instruction of the first indication, keeps a security key context for the path switch unchanged and indicates a primary base station to keep the security key context for the path switch unchanged, or under instruction of the first indication, indicates the primary base station to acquire a quantity of times of reversal of an NCC in the security key context such that synchronization of the security key context can still be ensured in a case in which a quantity of times of path switches triggered by carrier aggregation between base stations is excessively large, thereby improving reliability of a path switch during carrier aggregation between base stations.

Figure 7:
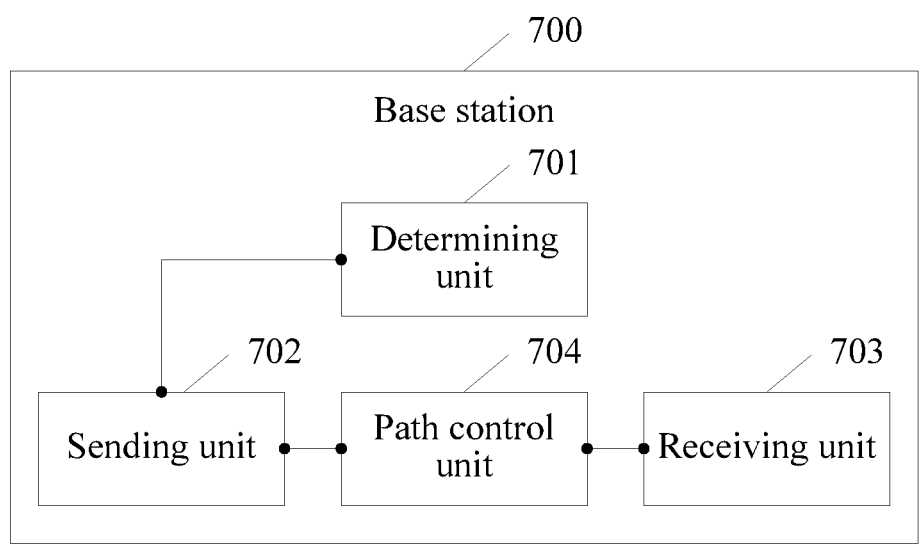
FIG. 7 is a schematic structural diagram of still another embodiment of a base station according to the present disclosure.

An embodiment of the present disclosure provides another base station. Referring to FIG. 7, a base station 700 in this embodiment of the present disclosure includes a determining unit 701 configured to confirm that a UE completes RRC configuration required by carrier aggregation between base stations, a sending unit 702 configured to send a path switch indication to an MME such that the MME sends the path switch indication to an SGW when the determining unit 701 confirms that the UE completes the RRC configuration required by the carrier aggregation between base stations, and the SGW uses an original path under instruction of the path switch indication when a current path switch fails, a receiving unit 703 configured to receive information that is from the MME and indicates that the path switch fails, and a path control unit 704 configured to use the original path when the receiving unit 703 receives the information that is from the MME and indicates that the path switch fails, and send a bearer release message to a secondary base station using the sending unit 702, to indicate the secondary base station to release a bearer for which the current path switch is performed.

It can be seen from the foregoing technical solutions that, in this embodiment of the present disclosure, a path switch indication is sent to an SGW such that the SGW uses an original path under instruction of the path switch indication when a current path switch fails, thereby preventing a problem of UE detachment caused by bearer release due to a path switch failure, and improving reliability of a path switch during carrier aggregation between base stations.

An embodiment of the present disclosure provides another base station. For a structure of the base station in this embodiment of the present disclosure, reference may be made to FIG. 6. The base station includes a transceiver apparatus and a processor.

The processor is configured to control the transceiver apparatus to send a path switch indication to an MME such that the MME sends the path switch indication to an SGW when confirming that a UE completes RRC configuration required by carrier aggregation between base stations, and the SGW uses an original path under instruction of the path switch indication when a current path switch fails, and use the original path when the transceiver apparatus receives information that is from the MME and indicates that the current path switch fails, and control the transceiver apparatus to send a bearer release message to a secondary base station, to indicate the secondary base station to release a bearer for which the current path switch is performed.

It can be seen from the foregoing technical solutions that, in this embodiment of the present disclosure, a path switch indication is sent to an SGW such that the SGW can use an original path under instruction of the path switch indication when a current path switch fails, thereby ensuring that a UE can still be attached even though the path switch fails, and improving reliability of a path switch during carrier aggregation between base stations.

Figure 8:
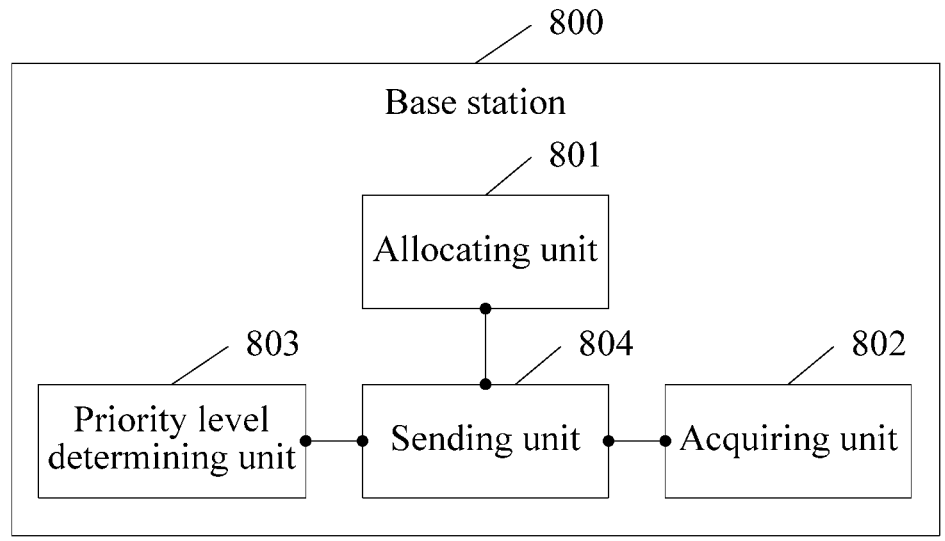
FIG. 8 is a schematic structural diagram of still another embodiment of a base station according to the present disclosure.

An embodiment of the present disclosure provides another base station. Referring to FIG. 8, a base station 800 in this embodiment of the present disclosure includes an allocating unit 801 configured to allocate a first path for a current path switch, an acquiring unit 802 configured to acquire a second path allocated by a secondary base station for the current path switch, a priority determining unit 803 configured to determine a priority of the first path and a priority of the second path, and a sending unit 804 configured to send path information to an MME, where the path information includes an identifier of the first path, an identifier of the second path, the priority of the first path, and the priority of the second path such that the MME sends the path information to an SGW, and the SGW switches a path to the first path or the second path preferentially according to a path with a higher priority.

It can be seen from the foregoing technical solutions that, in this embodiment of the present disclosure, path information is sent to an SGW such that the SGW switches a path to a first path or a second path preferentially according to a path with a higher priority when a current path switch fails, thereby ensuring that a UE can still be attached even though the path switch fails, and improving reliability of a path switch during carrier aggregation between base stations.

An embodiment of the present disclosure provides another base station, including a transceiver apparatus and a processor. For a schematic structural diagram thereof, reference may be made to FIG. 6.

The processor in this embodiment of the present disclosure is configured to allocate a first path for a current path switch and determine a priority of the first path, acquire a second path allocated by a secondary base station for the current path switch and determine a priority of the second path, and control the transceiver apparatus to send path information to an MME, where the path information includes an identifier of the first path, an identifier of the second path, the priority of the first path, and the priority of the second path such that the MME sends the path information to an SGW, and the SGW switches a path to the first path or the second path preferentially according to a path with a higher priority.

It can be seen from the foregoing technical solutions that, in this embodiment of the present disclosure, path information is sent to an SGW such that the SGW switches a path to a first path or a second path preferentially according to a path with a higher priority when a current path switch fails, thereby ensuring that a UE can still be attached even though the path switch fails, and improving reliability of a path switch during carrier aggregation between base stations.

Figure 9:
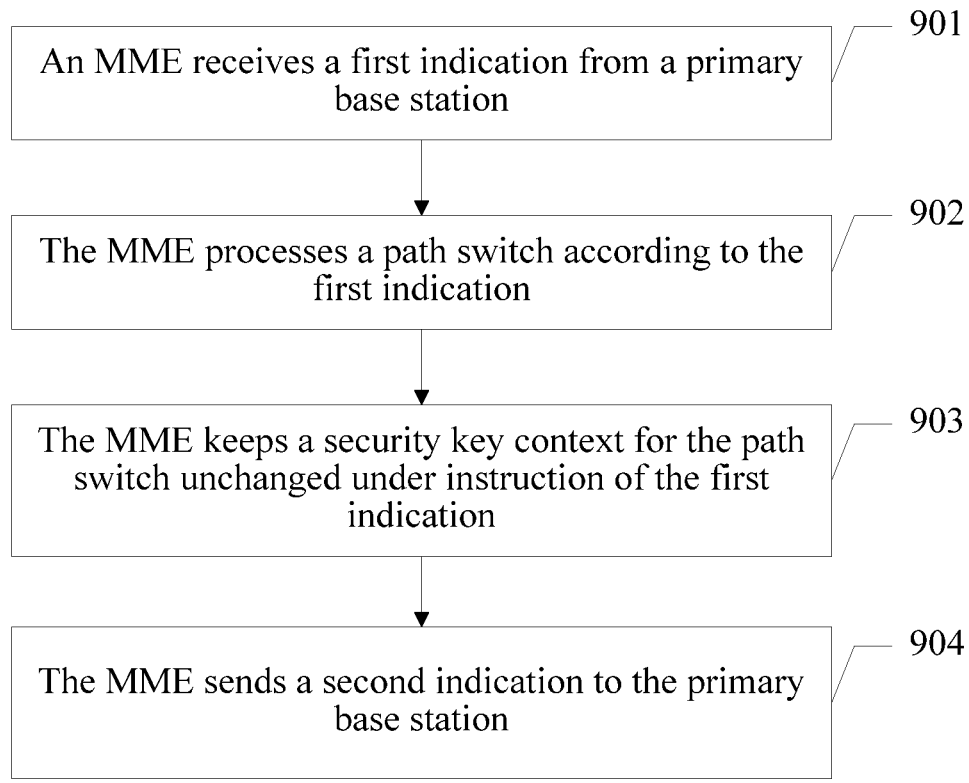
FIG. 9 is a schematic flowchart of an embodiment of a method of distributing a security key context according to the present disclosure.

The following describes a method of distributing a security key context in an embodiment of the present disclosure using an MME as an execution body. It should be noted that, the MME in this embodiment of the present disclosure may be the MME in the foregoing apparatus embodiments, and operations and steps thereof may be further implemented by functional modules in the foregoing apparatus embodiments. Referring to FIG. 9, a method of distributing a security key context in an embodiment of the present disclosure includes the following steps.

Step 901: An MME receives a first indication from a primary base station.

The first indication is used for requesting a path switch from the MME and indicating that the path switch is triggered by carrier aggregation between base stations, where the base stations include the primary base station.

In this embodiment of the present disclosure, when the primary base station decides to perform a path switch for a bearer and the path switch is triggered by carrier aggregation between base stations, the primary base station sends the first indication to the MME.

Furthermore, in an implementation manner, when the primary base station decides to hand over a bearer and confirms that a UE completes RRC configuration required by carrier aggregation between base stations (for example, receives an RRC connection reconfiguration complete indication fed back by the UE or receives an indication that is fed back by a secondary base station and indicates successful access of the UE), the primary base station sends a path switch request message to the MME, and adds the first indication to the path switch request message.

Alternatively, in another implementation manner, when the primary base station decides to perform a path switch for a bearer and the path switch is triggered by carrier aggregation between base stations, the primary base station sends the first indication to the MME by defining a new message.

The manner of sending the first indication is not limited in this embodiment of the present disclosure.

Step 902: The MME processes a path switch according to the first indication.

After receiving the first indication, the MME executes corresponding path switch processing under trigger of the first indication. For a path switch processing procedure, reference may be made to the description in the switch procedure shown in FIG. 1B, and details are not described herein again.

Step 903: The MME keeps a security key context for the path switch unchanged under instruction of the first indication.

For a path switch procedure after an X2 handover in an LTE system, an MME needs to update a security key context {NCC, NH}. An NCC is used for an NH. A security key KeNB used by an eNB and a UE is derived based on an NH corresponding to an NCC, and is used for data encryption/decryption and data integrity check. For the sake of security, the KeNB cannot be directly transferred between the eNB and the UE, when an X2 handover occurs, the eNB sends the NCC to the UE, and the UE derives the corresponding KeNB according to the NH corresponding to the NCC. At present, it is specified in a protocol that, in a path switch procedure, an MME adds 1 to an NCC and delivers the NCC and a corresponding NH to an eNB using a path switch request acknowledge message, for use by the eNB in a next switch.

In this embodiment of the present disclosure, the MME keeps the security key context for the path switch unchanged under instruction of the first indication. For example, {NCC, NH} is kept unchanged, that is, the operation of adding 1 is not executed for the NCC.

Step 904: The MME sends a second indication to the primary base station.

The second indication is used for indicating the primary base station to keep the security key context for the path switch unchanged.

In an implementation manner, when confirming that the path switch performed according to the first indication succeeds, the MME sends a path switch request acknowledge message to the primary base station, and adds the second indication to the path switch request acknowledge message. After receiving the path switch request acknowledge message, the primary base station keeps the security key context unchanged according to the second indication.

Alternatively, in another implementation manner, the MME sends a new message to the primary base station, where the message carries the security key context. After receiving the new message, the primary base station keeps the security key context unchanged according to the second indication.

Optionally, the MME adds the security key context to the second indication. After receiving the second indication, the primary base station stores the security key context carried in the second indication, and sends an NCC in the security key context to a UE when the UE needs to derive a KeNB.

Optionally, because the primary base station has a record about an original security key context, an implicit indication manner is used to instruct the primary base station to keep the original security key context unchanged. That is, it is agreed on that the primary base station acquires the security key context according to the second indication sent by the MME, the MME does not add the security key context to the second indication when the security key context needs to be kept unchanged, the primary base station keeps the security key context unchanged when the primary base station does not detect a security key context in the received second indication, and sends an NCC in the security key context to a UE when the UE needs to derive a KeNB.

In a path switch procedure, an SGW rejects a path switch request of a bearer according to a path condition and a local processing policy. Therefore, if the bearer is a default bearer, UE detachment may be caused, for example, if the bearer is a necessary bearer for maintaining a PDN connection, the PDN connection is released such that a UE may be detached. To solve the problem, this embodiment of the present disclosure provides the following two path switch indication solutions.

Solution 1: The SGW is indicated, using the first indication, to use an original path when the path switch fails, that is, when or after the MME receives the first indication, the MME sends the first indication to the SGW such that the SGW uses the original path under instruction of the first indication when the path switch fails. When the SGW indicates that the path switch fails (for example, when the MME receives information that is from the SGW and indicates that the current path switch fails), the primary base station is indicated to use the original path. Certainly, in this solution, the primary base station may also indicate, using another indication, the SGW to use the original path when the current path switch fails. For example, the primary base station may send, to the MME in the path switch procedure, another indication different from the first indication. After detecting the other indication, the MME sends the other indication to the SGW such that the SGW uses the original path under instruction of the other indication when the path switch fails.

Solution 2: In the path switch procedure, the primary base station sends path information to the SGW using the MME, where the path information includes an identifier of a first path allocated by the primary base station for the path switch (for example, a TEID of a downlink GTP tunnel allocated by the primary base station for the path switch), an identifier of a second path allocated by the secondary base station for the path switch (for example, a TEID of a downlink GTP tunnel allocated by the secondary base station for the path switch), a priority of the first path, and a priority of the second path such that the SGW switches a path to the first path or the second path preferentially according to a path with a higher priority in the priority of the first path and the priority of the second path. Optionally, the priority of the first path and the priority of the second path are set according to an actual condition or are set by default, for example, it is set by default that a priority of a path in a path list is higher than a priority of a path arranged behind the path. Optionally, the path information is carried in the first indication, or the primary base station may send the path information to the MME using another message such that the MME sends the path information to the SGW, which is not limited herein.

Alternatively, optionally, during bearer establishment, the MME indicates the primary base station not to hand over a default bearer to the secondary base station. Further, the MME may also indicate, to the primary base station using an identifier of a default bearer, a specific default bearer that is not handed over to the secondary base station. When a bearer for which the current path switch is performed is the default bearer that is indicated by the MME and is not handed over to the secondary base station, the primary base station does not hand over the default bearer to the secondary base station, thereby preventing a problem of UE detachment caused by a path switch failure of the default bearer.

It can be seen from the foregoing technical solutions that, in this embodiment of the present disclosure, when a primary base station sends a first indication to a MME, the MME processes a path switch according to the first indication, and under instruction of the first indication, keeps a security key context for the path switch unchanged and indicates the primary base station to keep the security key context for the path switch unchanged such that synchronization of the security key context can still be ensured in a case in which a quantity of times of path switches triggered by carrier aggregation between base stations is excessively large, thereby improving reliability of a path switch during carrier aggregation between base stations. Further, this embodiment of the present disclosure further provides a path switch indication solution such that an original path is used when the path switch fails or the path switch is performed in two or more paths according to priorities of the paths, thereby reducing a possibility of bearer release and UE detachment that are caused by a path switch failure, and further improving the reliability of a path switch during the carrier aggregation between base stations.

Figure 10:
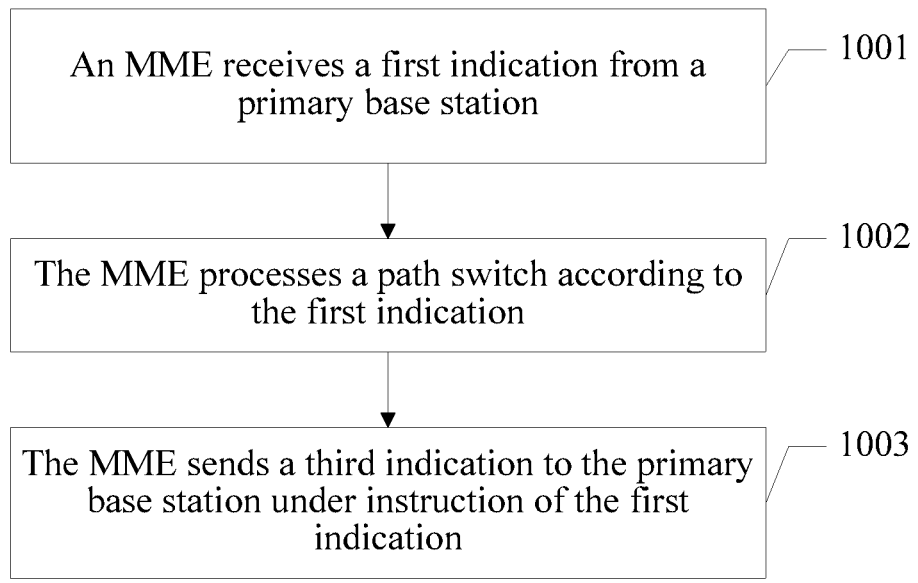
FIG. 10 is a schematic flowchart of another embodiment of a method of distributing a security key context according to the present disclosure.

The following describes another method of distributing a security key context in the present disclosure using an MME as an execution body. It should be noted that, the MME in this embodiment of the present disclosure may be the MME in the foregoing apparatus embodiments, and operations and steps thereof may be further implemented by functional modules in the foregoing apparatus embodiments. Referring to FIG. 10, a method of distributing a security key context in an embodiment of the present disclosure includes the following steps.

Step 1001: An MME receives a first indication from a primary base station.

The first indication is used for requesting a path switch from the MME and indicating that the path switch is triggered by carrier aggregation between base stations.

In this embodiment of the present disclosure, the primary base station sends the first indication to the MME when the primary base station decides to perform a path switch for a bearer and the path switch is triggered by carrier aggregation between base stations.

Further, in an implementation manner, when the primary base station decides to hand over a bearer and confirms that a UE completes RRC configuration required by carrier aggregation between base stations (for example, receives an RRC connection reconfiguration complete indication fed back by the UE or receives an indication that is fed back by a secondary base station and indicates successful access of the UE), the primary base station sends a path switch request message to the MME, and adds the first indication to the path switch request message.

Alternatively, in another implementation manner, when the primary base station decides to perform a path switch for a bearer and the path switch is triggered by carrier aggregation between base stations, the primary base station sends the first indication to the MME by defining a new message.

The manner of sending the first indication is not limited in this embodiment of the present disclosure.

Step 1002: The MME processes a path switch according to the first indication.

After receiving the first indication, the MME executes the corresponding path switch under trigger of the first indication. Further, for a path switch procedure, reference may be made to the description in the switch procedure shown in FIG. 1B, and details are not described herein again.

Step 1003: The MME sends a third indication to the primary base station under instruction of the first indication such that the primary base station acquires a quantity of times of reversal of an NCC in a security key context for the path switch according to the third indication.

In this embodiment of the present disclosure, the MME updates the NCC according to an original security key context processing mechanism, that is, adds 1 to the NCC each time a switch is performed, and then sends the third indication to the primary base station such that the primary base station acquires the quantity of times of reversal of the NCC in the security key context for the path switch according to the third indication, where the quantity of times of reversal refers to a quantity of times that the NCC jumps from a maximum value to a minimum value.

Optionally, the MME records the quantity of times of reversal of the NCC, and adds the quantity of times of reversal of the NCC to the third indication sent to the primary base station such that the primary base station acquires the quantity of times of reversal of the NCC from the third indication.

Optionally, the third indication is carried in a path switch request acknowledge message, or the MME may send the third indication to the primary base station using another new message, which is not limited herein.

After the reversal of the NCC, even though a value of the NCC is the same as that before, an NH corresponding to the NCC is different. Therefore, in this embodiment of the present disclosure, when a UE needs to derive a security key (for example, when a handover occurs on the UE), the primary base station sends a current NCC and a quantity of times of reversal of the NCC to the UE such that the UE can determine a corresponding NH according to the received current NCC and the received quantity of times of reversal of the NCC, and further derive a security key synchronized with that of the primary base station.

Description is provided using an example. As shown in Table 1, an initial value of an NCC is 0, a quantity of times of reversal is 0, and an NH used by the primary base station is an NH1. The UE determines, according to the quantity 0 of times of reversal, that the UE needs to use the security key NH1 too. However, if the quantity of times of reversal is 1, the primary base station and the UE need to use a key obtained after reversal, that is, an NH corresponding to the NCC with the value 0 is an NH9 after the NCC is reversed once, as shown in the following table.

TABLE 1

| NCC value | NH |
|---|---|
| 0 | NH1 |
| 1 | NH2 |
| 2 | NH3 |
| 3 | NH4 |
| 4 | NH5 |
| 5 | NH6 |
| 6 | NH7 |
| 7 | NH8 |
| 0 | NH9 |
| 1 | NH10 |

In a path switch procedure, an SGW rejects a path switch request of a bearer according to a path condition and a local processing policy. Therefore, if the bearer is a default bearer, UE detachment may be caused, for example, if the bearer is a necessary bearer for maintaining a PDN connection, the PDN connection is released such that a UE may be detached. To solve the problem, this embodiment of the present disclosure provides the following two path switch indication solutions.

Solution 1: The SGW is indicated, using the first indication, to use an original path when the path switch fails, then, when or after the MME receives the first indication, the MME sends the first indication to the SGW such that the SGW uses the original path under instruction of the first indication when the path switch fails. When the SGW indicates that the path switch fails (for example, when the MME receives information that is from the SGW and indicates that the current path switch fails), the primary base station is indicated to use the original path. Certainly, in this solution, the primary base station may also indicate, using another indication, the SGW to use the original path when the current path switch fails. For example, the primary base station may send, to the MME in the path switch procedure, another indication different from the first indication. After detecting the other indication, the MME sends the other indication to the SGW such that the SGW uses the original path under instruction of the other indication when the path switch fails.

Solution 2: In the path switch procedure, the primary base station sends path information to the SGW using the MME, where the path information includes an identifier of a first path allocated by the primary base station for the path switch (for example, a TEID of a DL-GTP tunnel allocated by the primary base station for the path switch), an identifier of a second path allocated by the secondary base station for the path switch (for example, a TEID of a DL-GTP tunnel allocated by the secondary base station for the path switch), a priority of the first path, and a priority of the second path such that the SGW switches a path to the first path or the second path preferentially according to a path with a higher priority in the priority of the first path and the priority of the second path. Optionally, the priority of the first path and the priority of the second path are set according to an actual condition or are set by default, for example, it is set by default that a priority of a path in a path list is higher than a priority of a path arranged behind the path. Optionally, the path information is carried in the first indication, or the primary base station may send the path information to the MME using another message such that the MME sends the path information to the SGW, which is not limited herein.

Alternatively, optionally, during bearer establishment, the MME indicates the primary base station not to hand over a default bearer to the secondary base station. Further, the MME may also indicate, to the primary base station using an identifier of a default bearer, a specific default bearer that is not handed over to the secondary base station. When a bearer for which the current path switch is performed is the default bearer that is indicated by the MME and is not handed over to the secondary base station, the primary base station does not hand over the default bearer to the secondary base station, thereby preventing a problem of UE detachment caused by a path switch failure of the default bearer.

It can be seen from the foregoing technical solutions that, in this embodiment of the present disclosure, when a primary base station sends a first indication to a MME, the MME processes a path switch according to the first indication, and under instruction of the first indication, indicates the primary base station to acquire a quantity of times of reversal of an NCC in a security key context such that synchronization of the security key context can still be ensured by acquiring an accurate NH using the quantity of times of reversal of the NCC in a case in which a quantity of times of path switches triggered by carrier aggregation between base stations is excessively large, thereby improving reliability of a path switch during carrier aggregation between base stations. Further, this embodiment of the present disclosure further provides a path switch indication solution such that an original path is used when the path switch fails or the path switch is performed in two or more paths according to priorities of the paths, thereby reducing a possibility of bearer release and UE detachment that are caused by a path switch failure, and further improving the reliability of a path switch during the carrier aggregation between base stations.

Figure 11:
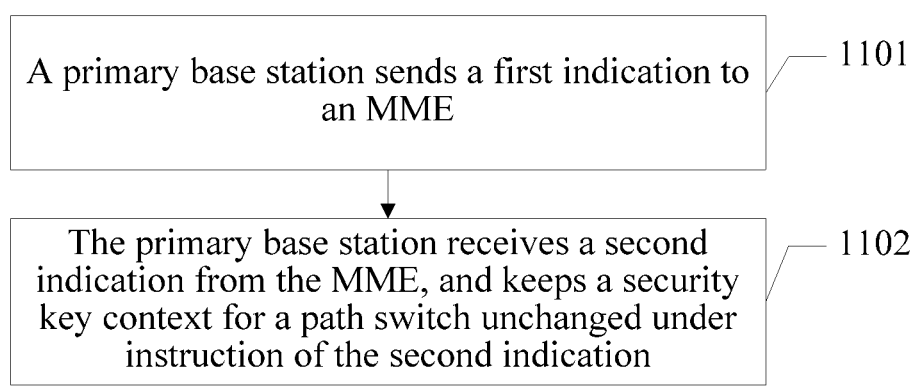
FIG. 11 is a schematic flowchart of still another embodiment of a method of distributing a security key context according to the present disclosure.

The following describes a method of distributing a security key context in the present disclosure using a primary base station as an execution body. It should be noted that, the primary base station in this embodiment of the present disclosure may be the base station in the foregoing apparatus embodiments, and operations and steps thereof may be further implemented by functional modules in the foregoing apparatus embodiments. Referring to FIG. 11, a method of distributing a security key context in an embodiment of the present disclosure includes the following steps.

Step 1101: A primary base station sends a first indication to an MME.

The first indication is used for requesting a path switch from the MME and indicating that the path switch is triggered by carrier aggregation between base stations such that the MME processes the path switch according to the first indication.

Furthermore, in an implementation manner, when the primary base station decides to hand over a bearer and confirms that a UE completes RRC configuration required by carrier aggregation between base stations (for example, receives an RRC connection reconfiguration complete indication fed back by the UE or receives an indication that is fed back by a secondary base station and indicates successful access of the UE), the primary base station sends a path switch request message to the MME, and adds the first indication to the path switch request message.

Alternatively, in another implementation manner, when the primary base station decides to perform a path switch for a bearer and the path switch is triggered by carrier aggregation between base stations, the primary base station sends the first indication to the MME by defining a new message.

The manner of sending the first indication is not limited in this embodiment of the present disclosure.

After receiving the first indication, the MME executes the corresponding path switch under trigger of the first indication. Further, for a path switch procedure, reference may be made to the description in the switch procedure shown in FIG. 1B, and details are not described herein again.

Step 1102: The primary base station receives a second indication from the MME, and keeps a security key context for a path switch unchanged according to the second indication.

In this embodiment of the present disclosure, the second indication is carried in a path switch request acknowledge message responding to a path switch request message, or the second indication may be carried in a new message, which is not limited herein.

Optionally, the second indication carries the security key context. After receiving the second indication, the primary base station stores the security key context carried in the second indication, and sends an NCC in the security key context to a UE when the UE needs to derive a KeNB.

Optionally, because the primary base station has a record about an original security key context, an implicit indication manner is used to instruct the primary base station to keep the security key context unchanged. That is, it is agreed on that the primary base station acquires the security key context according to the second indication sent by the MME. When the security key context needs to be kept unchanged, the MME does not add the security key context to the second indication. When the primary base station does not detect a security key context in the received second indication, the primary base station keeps the security key context unchanged, and sends an NCC in the security key context to a UE when determining that the UE needs to derive a KeNB.

In a path switch procedure, an SGW rejects a path switch request of a bearer according to a path condition and a local processing policy. Therefore, if the bearer is a default bearer, UE detachment may be caused, for example, if the bearer is a necessary bearer for maintaining a PDN connection, the PDN connection is released such that a UE may be detached.

To solve the problem, this embodiment of the present disclosure provides the following two path switch indication solutions.

Solution 1: The SGW is indicated, using the first indication, to use an original path when the current path switch fails. Then, the MME sends the first indication to the SGW such that the SGW uses the original path under instruction of the first indication when the current path switch fails when or after the MME receives the first indication. When the MME receives information that is from the SGW and indicates that the current path switch fails, the MME sends, to the primary base station, the information indicating that the current path switch fails such that the primary base station uses the original path, and sends a bearer release message to the secondary base station, to indicate the secondary base station to release a bearer for which the current path switch is performed. Certainly, in this solution, the primary base station may also indicate, using another indication, the SGW to use the original path when the current path switch fails. For example, the primary base station may send, to the MME in the path switch procedure, another indication different from the first indication. After detecting the other indication, the MME sends the other indication to the SGW such that the SGW uses the original path under instruction of the other indication when the current path switch fails.

Solution 2: The primary base station allocates a first path for the current path switch and determines a priority of the first path, acquires a second path allocated by the secondary base station for the current path switch and determines a priority of the second path, and sends path information to the SGW using the MME, where the path information includes an identifier of the first path (for example, a TEID of a downlink GTP tunnel allocated by the primary base station for the current path switch), an identifier of the second path (for example, a TEID of a downlink GTP tunnel allocated by the secondary base station for the current path switch), the priority of the first path, and the priority of the second path such that the SGW performs the path switch preferentially according to a path with a higher priority in the priority of the first path and the priority of the second path, and performs the path switch according to a path with a lower priority when the path switch performed according to the path with the higher priority fails. Optionally, the priority of the first path and the priority of the second path are set according to an actual condition or are set by default, for example, it is set by default that a priority of a path in a path list is higher than a priority of a path arranged behind the path. Optionally, the path information is carried in the first indication, or the primary base station may send the path information to the MME using another message such that the MME sends the path information to the SGW, which is not limited herein.

Alternatively, optionally, during bearer establishment, the MME indicates the primary base station not to hand over a default bearer to the secondary base station. Further, the MME may also indicate, to the primary base station using an identifier of a default bearer, a specific default bearer that is not handed over to the secondary base station. When a bearer for which the current path switch is performed is the default bearer that is indicated by the MME and is not handed over to the secondary base station, the primary base station does not hand over the default bearer to the secondary base station, thereby preventing a problem of UE detachment caused by a path switch failure of the default bearer.

It can be seen from the foregoing technical solutions that, in this embodiment of the present disclosure, when a path switch is triggered by carrier aggregation between base stations, a primary base station sends a first indication to an MME such that the MME processes the path switch according to the first indication, and under instruction of the first indication, keeps a security key context for the path switch unchanged and indicates the primary base station to keep the security key context unchanged such that synchronization of the security key context can still be ensured in a case in which a quantity of times of path switches triggered by carrier aggregation between base stations is excessively large, thereby improving reliability of a path switch during carrier aggregation between base stations. Further, this embodiment of the present disclosure further provides a path switch indication solution such that an original path is used when the path switch fails or the path switch is performed in two or more paths according to priorities of the paths, thereby reducing a possibility of bearer release and UE detachment that are caused by a path switch failure, and further improving the reliability of a path switch during the carrier aggregation between base stations.

Figure 12:
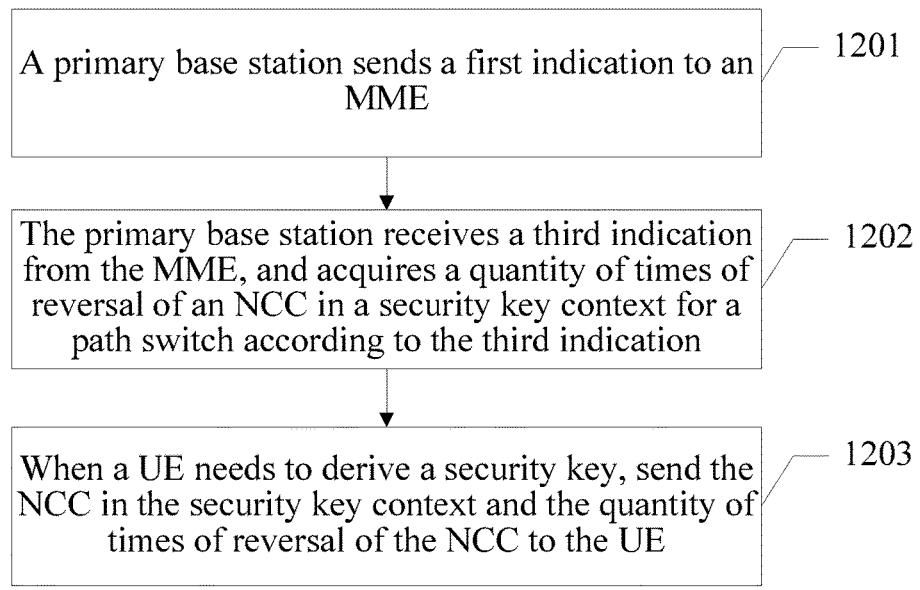
FIG. 12 is a schematic flowchart of still another embodiment of a method of distributing a security key context according to the present disclosure.

The following describes a method of distributing a security key context in the present disclosure using a primary base station as an execution body. It should be noted that, the primary base station in this embodiment of the present disclosure may be the base station in the foregoing apparatus embodiments, and operations and steps thereof may be further implemented by functional modules in the foregoing apparatus embodiments. Referring to FIG. 12, a method of distributing a security key context in an embodiment of the present disclosure includes the following steps.

Step 1201: A primary base station sends a first indication to an MME.

The first indication is used for requesting a path switch from the MME and indicating that the path switch is triggered by carrier aggregation between base stations such that the MME processes the path switch according to the first indication.

Further, in an implementation manner, when the primary base station decides to hand over a bearer and confirms that a UE completes RRC configuration required by carrier aggregation between base stations (for example, receives an RRC connection reconfiguration complete indication fed back by the UE or receives an indication that is fed back by a secondary base station and indicates successful access of the UE), the primary base station sends a path switch request message to the MME, and adds the first indication to the path switch request message.

Alternatively, in another implementation manner, when the primary base station decides to perform a path switch for a bearer and the path switch is triggered by carrier aggregation between base stations, the primary base station sends the first indication to the MME by defining a new message.

The manner of sending the first indication is not limited in this embodiment of the present disclosure.

After receiving the first indication, the MME executes the corresponding path switch under trigger of the first indication. Further, for a path switch procedure, reference may be made to the description in the switch procedure shown in FIG. 1B, and details are not described herein again.

Step 1202: The primary base station receives a third indication from the MME, and acquires a quantity of times of reversal of an NCC in a security key context for a path switch according to the third indication.

In this embodiment of the present disclosure, the quantity of times of reversal refers to a quantity of times that the NCC jumps from a maximum value to a minimum value.

Optionally, the MME records the quantity of times of reversal of the NCC, and adds the quantity of times of reversal of the NCC to the third indication sent to the primary base station such that the primary base station acquires the quantity of times of reversal of the NCC from the third indication.

Optionally, the primary base station records the quantity of times of reversal of the NCC in the security key context under instruction of the third indication.

In this embodiment of the present disclosure, the third indication is carried in a path switch request acknowledge message responding to a path switch request message, or the third indication may be carried in a new message, which is not limited herein.

Step 1203: When a UE needs to derive a security key, send the NCC in the security key context and the quantity of times of reversal of the NCC to the UE such that the UE derives the security key according to the current NCC and the quantity of times of reversal of the NCC.

The UE is a UE served by the primary base station.

In a path switch procedure, an SGW rejects a path switch request of a bearer according to a path condition and a local processing policy. Therefore, if the bearer is a default bearer, UE detachment may be caused, for example, if the bearer is a necessary bearer for maintaining a PDN connection, the PDN connection is released such that a UE may be detached. To solve the problem, this embodiment of the present disclosure further provides the following two path switch indication solutions.

Solution 1: The SGW is indicated, using the first indication, to use an original path when the path switch fails. Then, the MME sends the first indication to the SGW such that the SGW uses the original path under instruction of the first indication when the path switch fails when or after the MME receives the first indication. When the SGW indicates that the path switch fails (for example, when the MME receives information that is from the SGW and indicates that the current path switch fails), the primary base station is indicated to use the original path. Certainly, in this solution, the primary base station may also indicate, using another indication, the SGW to use the original path when the current path switch fails. For example, the primary base station may send, to the MME in the path switch procedure, another indication different from the first indication. After detecting the other indication, the MME sends the other indication to the SGW such that the SGW uses the original path under instruction of the other indication when the path switch fails.

Solution 2: In the path switch procedure, the primary base station sends path information to the SGW using the MME, where the path information includes an identifier of a first path allocated by the primary base station for the path switch (for example, a TEID of a DL-GTP tunnel allocated by the primary base station for the path switch), an identifier of a second path allocated by the secondary base station for the path switch (for example, a TEID of a DL-GTP tunnel allocated by the secondary base station for the path switch), a priority of the first path, and a priority of the second path such that the SGW switches a path to the first path or the second path preferentially according to a path with a higher priority in the priority of the first path and the priority of the second path. Optionally, the priority of the first path and the priority of the second path are set according to an actual condition or are set by default, for example, it is set by default that a priority of a path in a path list is higher than a priority of a path arranged behind the path. Optionally, the path information is carried in the first indication, or the primary base station may send the path information to the MME using another message such that the MME sends the path information to the SGW, which is not limited herein.

Alternatively, optionally, during bearer establishment, the MME indicates the primary base station not to hand over a default bearer to the secondary base station. Further, the MME may also indicate, to the primary base station using an identifier of a default bearer, a specific default bearer that is not handed over to the secondary base station. When a bearer for which the current path switch is performed is the default bearer that is indicated by the MME and is not handed over to the secondary base station, the primary base station does not hand over the default bearer to the secondary base station, thereby preventing a problem of UE detachment caused by a path switch failure of the default bearer.

It can be seen from the foregoing technical solutions that, in this embodiment of the present disclosure, when a path switch is triggered by carrier aggregation between base stations, a primary base station sends a first indication to an MME such that under instruction of the first indication, the MME processes the path switch, and indicates the primary base station to acquire a quantity of times of reversal of an NCC in a security key context such that synchronization of the security key context can still be ensured by acquiring an accurate NH using the quantity of times of reversal of the NCC in a case in which a quantity of times of path switches triggered by carrier aggregation between base stations is excessively large, thereby improving reliability of a path switch during carrier aggregation between base stations. This embodiment of the present disclosure further provides a path switch indication solution, which is used to effectively prevent a problem of UE detachment caused by bearer release due to a path switch failure, and further improving the reliability of a path switch during the carrier aggregation between base stations.

Figure 13:
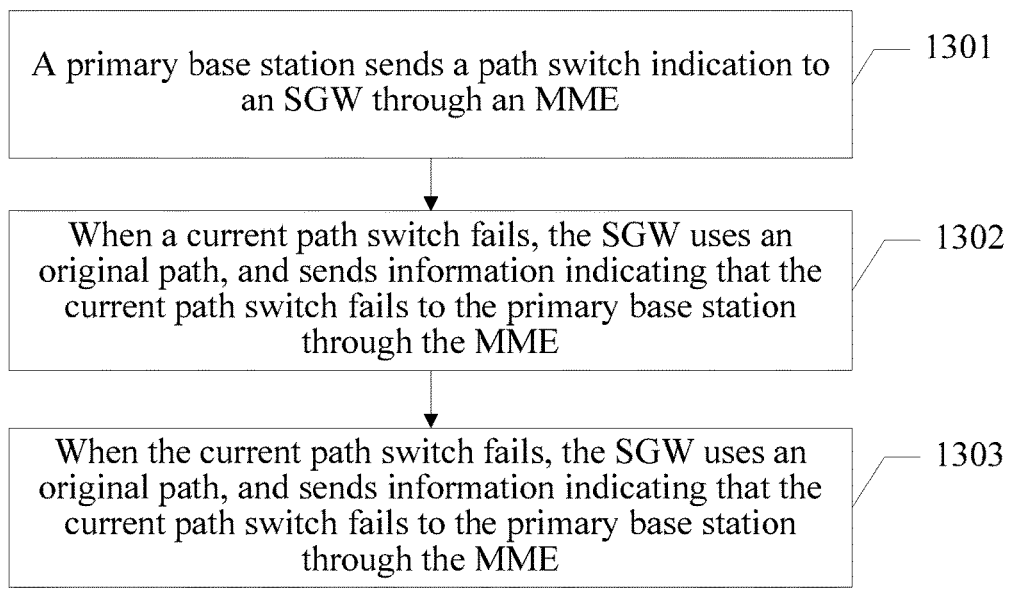
FIG. 13 is a schematic flowchart of an embodiment of a path switch indication method according to the present disclosure.

The following describes a path switch indication method in an embodiment of the present disclosure using a primary base station as an execution body. It should be noted that, the primary base station in this embodiment of the present disclosure may be the base station in the foregoing apparatus embodiments, and operations and steps thereof may be further implemented by functional modules in the foregoing apparatus embodiments. Referring to FIG. 13, the method includes the following steps.

Step 1301: A primary base station sends a path switch indication to an SGW through an MME.

The path switch indication is used for indicating the SGW to use an original path when a current path switch fails.

In this embodiment of the present disclosure, when deciding to offload data, for example, deciding, according to a measurement report and a load condition, to hand over a bearer to a secondary base station, the primary base station sends a bearer establishment request message to the secondary base station. If allowing bearer establishment, the secondary base station allocates a DL-GTP tunnel for the bearer, and sends DL-GTP information of the DL-GTP tunnel to the primary base station using a bearer establishment response message. After receiving the bearer establishment response message, the primary base station sends the path switch indication to the MME such that the MME forwards the path switch indication to the SGW.

Optionally, after receiving the bearer establishment response message, the primary base station sends a path switch request message to the MME, and adds the path switch indication to the path switch request message.

Step 1302: When a current path switch fails, the SGW uses an original path, and sends information indicating that the current path switch fails to the primary base station through the MME.

Step 1303: When the current path switch fails, the SGW uses an original path, and sends information indicating that the current path switch fails to the primary base station through the MME.

Further, the primary base station sends a bearer release message to the secondary base station, to request the secondary base station to release the bearer for which the current switch fails.

It can be seen from the foregoing technical solutions that, in this embodiment of the present disclosure, a path switch indication is sent to an SGW such that the SGW uses an original path under instruction of the path switch indication when a current path switch fails, thereby preventing a problem of UE detachment caused by bearer release due to a path switch failure, and improving reliability of a path switch during carrier aggregation between base stations.

Figure 14:
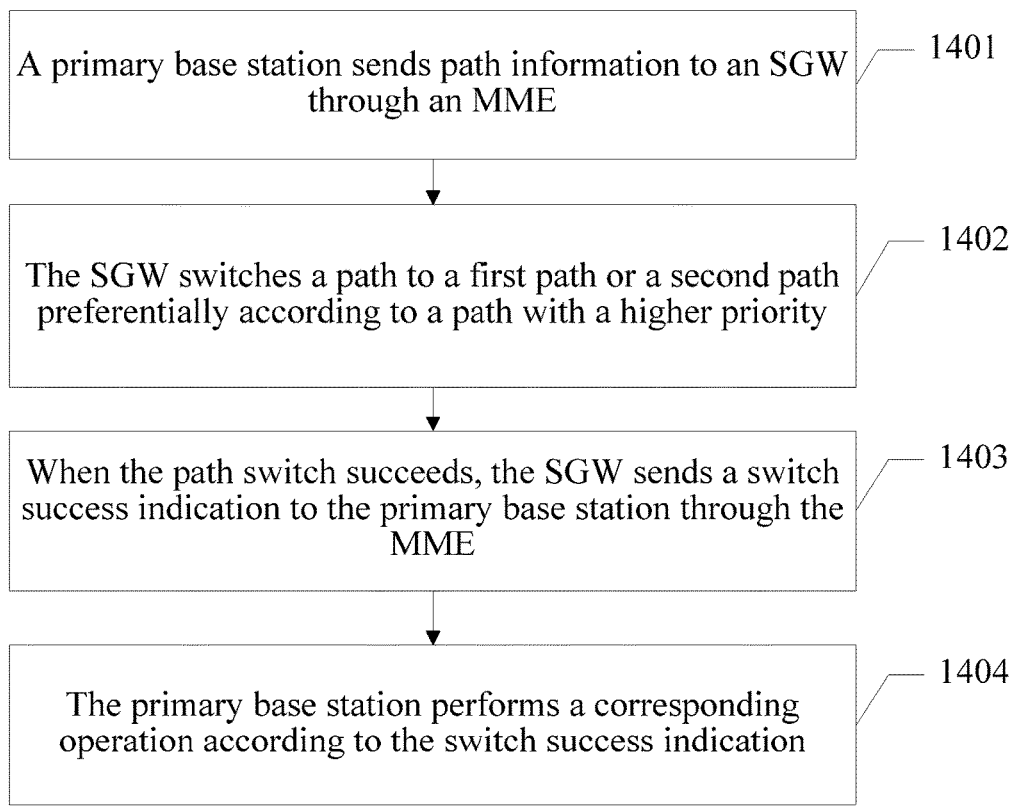
FIG. 14 is a schematic flowchart of another embodiment of a path switch indication method according to the present disclosure.

The following describes another path switch indication method in an embodiment of the present disclosure using a primary base station as an execution body. It should be noted that, the primary base station in this embodiment of the present disclosure may be the base station in the foregoing apparatus embodiments, and operations and steps thereof may be further implemented by functional modules in the foregoing apparatus embodiments. Referring to FIG. 14, the method includes the following steps.

Step 1401: A primary base station sends path information to an SGW through an MME.

The path information includes an identifier of a first path allocated by the primary base station for a current path switch (for example, a TEID of a downlink GTP tunnel allocated by the primary base station for the current path switch), an identifier of a second path allocated by a secondary base station for the current path switch (for example, a TEID of a DL-GTP tunnel allocated by the secondary base station for the current path switch), a priority of the first path, and a priority of the second path.

In this embodiment of the present disclosure, when deciding to offload data, for example, deciding, according to a measurement report and a load condition, to hand over a bearer to the secondary base station, the primary base station sends a bearer establishment request message to the secondary base station. If allowing bearer establishment, the secondary base station allocates a DL-GTP tunnel (that is, the second path) for the bearer, and sends DL-GTP information of the downlink GTP tunnel to the primary base station using a bearer establishment response message. After receiving the bearer establishment response message, the primary base station allocates a DL-GTP tunnel (that is, the first path) for the bearer, and sends the path information to the MME such that the MME forwards the path information to the SGW. Optionally, the priority of the first path and the priority of the second path in the path information are set according to an actual condition or are set by default, for example, it is set by default that a priority of a path in a path list is higher than a priority of a path arranged behind the path.

Step 1402: The SGW switches a path to a first path or a second path preferentially according to a path with a higher priority.

Step 1403: When the path switch succeeds, the SGW sends a switch success indication to the primary base station through the MME.

The switch success indication carries information about a path used when the current path switch succeeds.

Step 1404: The primary base station performs a corresponding operation according to the switch success indication.

If the switch success indication indicates that the path used when the current path switch succeeds is the first path allocated by the primary base station, the primary base station triggers the secondary base station to release bearer information related to the current path switch such that the bearer is maintained on the primary base station. If the switch success indication indicates that the path used when the current path switch succeeds is the second path allocated by the secondary base station, the primary base station sends, to the secondary base station, UL-GTP information allocated by the SGW such that the bearer is handed over to the secondary base station.

It can be seen from the foregoing technical solutions that, in this embodiment of the present disclosure, path information is sent to an SGW such that the SGW performs a path switch preferentially according to a path with a higher priority in path priorities in the path information when a current path switch fails, and performs the path switch according to a path with a lower priority when the path switch performed according to the path with the higher priority fails, thereby preventing a problem of UE detachment caused by bearer release due to a path switch failure, and improving reliability of a path switch during carrier aggregation between base stations.

An embodiment of the present disclosure further provides a computer storage medium, where the computer storage medium stores a program, and the program performs some or all of the steps recorded in the foregoing method embodiments.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The method of distributing a security key context, the path switch indication method, the MME, and the base station provided by the present disclosure are described above in detail. A person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A core network apparatus, comprising:
   a receiver configured to receive a first indication from a primary base station, the first indication including a downlink general packet radio service tunneling protocol (GTP) Internet Protocol (IP) address used for handing over a bearer from the primary base station to a secondary base station; and
   a transmitter coupled to the receiver and configured to send a second indication to the primary base station to keep a security key context unchanged, the second indication excluding the security key context.

2. The core network apparatus of claim 1, wherein the first indication further comprises an identifier of a downlink GTP tunnel.

3. The core network apparatus of claim 2, wherein the transmitter is further configured to send a message to a serving gateway (SGW), and the message includes the downlink GTP IP address and the identifier of the downlink GTP tunnel.

4. The core network apparatus of claim 1, wherein the core network apparatus is a mobility management entity (MME).

5. A base station, comprising:
   a transmitter configured to send a first indication to a core network entity, the first indication including a downlink general packet radio service tunneling protocol (GTP) Internet Protocol (IP) address used for handing over a bearer from the base station to a secondary base station;
   a receiver configured to receive a second indication from the core network entity; and
   a processor coupled to the receiver and the transmitter and configured to keep a security key context unchanged when not detecting the security key context in the second indication.

6. The base station of claim 5, wherein the processor is further configured to confirm to hand over the bearer from the base station to the secondary base station.

7. The base station of claim 5, wherein the first indication further comprises an identifier of a downlink GTP tunnel.

8. The base station of claim 5, wherein the core network entity is a mobility management entity (MME).

9. The base station of claim 5, wherein the processor is further configured to confirm a terminal to complete radio resource control (RRC) configuration with the secondary base station.

10. A method, comprising:
    receiving, by a core network entity, a first indication from a primary base station, the first indication comprising a downlink general packet radio service tunneling protocol (GTP) Internet Protocol (IP) address used for handing over a bearer from the primary base station to a secondary base station; and
    sending, by the core network entity, a second indication to the primary base station to keep a security key context unchanged, the second indication excluding the security key context.

11. The method of claim 10, wherein the first indication further comprises an identifier of a downlink GTP tunnel.

12. The method of claim 11, further comprising sending, by the core network entity, a message to a serving gateway (SGW), wherein the message includes the downlink GTP IP address and the identifier of the downlink GTP tunnel.

13. The method of claim 10, wherein the core network entity is a mobility management entity (MME).

14. A method, comprising:
    sending, by a primary base station, a first indication to a core network apparatus, the first indication including a downlink general packet radio service tunneling protocol (GTP) Internet Protocol (IP) address used for handing over a bearer from the primary base station to a secondary base station;
    receiving, by the primary base station, a second indication from the core network apparatus; and
    keeping, by the primary base station, a security key context, the security key context not being included in the second indication.

15. The method of claim 14, wherein sending the first indication to the core network apparatus comprises confirming, by the primary base station, to hand over the bearer from the primary base station to the secondary base station.

16. The method of claim 14, wherein the first indication further comprises an identifier of a downlink GTP tunnel.

17. The method of claim 14, wherein the core network apparatus is a mobility management entity (MME).

18. The method of claim 14, wherein sending the first indication to the core network apparatus comprises confirming, by the primary base station, a terminal to complete radio resource control (RRC) configuration with the secondary base station.

* * * * *